United States Patent [19]

Krause

[11] 4,152,268
[45] May 1, 1979

[54] ARRANGEMENT FOR REMOVING WATER FROM MUD

[76] Inventor: Walter Krause, D7121 Walheim (Württemberg), Fed. Rep. of Germany

[21] Appl. No.: 777,058

[22] Filed: Mar. 14, 1977

[30] Foreign Application Priority Data

Mar. 26, 1976 [DE] Fed. Rep. of Germany ... 7609290[U]

[51] Int. Cl.² ............................................. B01D 33/00
[52] U.S. Cl. ................................... 210/359; 210/284; 210/323 T; 210/409; 210/448; 210/452; 100/123; 100/211
[58] Field of Search ............... 210/332, 452, 448, 113, 210/409, 236, 359, 415, 484, 323 T; 55/341 NT, 369; 100/122-124, 211, 297, 107

[56] References Cited

U.S. PATENT DOCUMENTS

| 475,774 | 5/1892 | Iles | 55/341 NT |
|---|---|---|---|
| 671,003 | 4/1901 | Ruthenburg | 210/409 |
| 942,697 | 12/1909 | Allen | 210/113 |
| 3,191,365 | 6/1965 | Feeley | 55/369 |
| 3,535,852 | 10/1970 | Hirs | 210/484 |
| 3,624,729 | 11/1971 | Hoover | 100/211 |
| 3,670,898 | 6/1972 | Fournier | 210/484 |

FOREIGN PATENT DOCUMENTS

| 624160 | 7/1927 | France | 55/369 |
|---|---|---|---|
| 1032628 | 4/1953 | France | 100/123 |
| 250047 | 4/1926 | United Kingdom | 100/122 |

Primary Examiner—Charles N. Hart
Assistant Examiner—Benôit Castel
Attorney, Agent, or Firm—Michael J. Striker

[57] ABSTRACT

An arrangement for removing water from mud and the like has a flexible container having an inlet and an outlet opening. A flexible tubular member is located outside and adjacent the outlet opening of the container. Means are provided for deforming the flexible tubular member so that the latter closes the outlet opening of the container during dewatering of the mud. The flexible tubular member may be formed either of a one piece with the container or as a separate part connected to a front end portion of the same. At least two ring-shaped elements are provided, one of which elements is connected to the front portion of the container, and the other element is connected to the flexible tubular member and rotatable relative to the first ring-shaped element. By means of rotation of the other ring-shaped element the flexible tubular member is deformed so as to close the outlet opening.

30 Claims, 9 Drawing Figures

ARRANGEMENT FOR REMOVING WATER FROM MUD

BACKGROUND OF THE INVENTION

The invention relates to an arrangement for removing water from mud and the like, and particularly for removing water from sewage sludge. More particularly, the present invention relates to an arrangement for removing water from mud which comprises a container of a flexible porous material suspended to a support structure, and having a tubular side wall bounding a chamber for receiving mud therein.

Various types of arrangments for removing water from mud have been already proposed. The known arrangements comprise a container for receiving mud therein having a funnel-shaped bottom part of a reduced cross-section, which bottom part is connected to an offtake pipe provided with a locking device and adapted to discharge the dewatered mud. In such construction the mud after dewatering is discharged through a reduced funnel-shaped bottom part and then through a narrow outlet opening. This has the disadvantage that the dewatered and compressed mud hardly passes through the narrow outlet opening and frequently clogs the narrow offtake pipes.

SUMMARY OF THE INVENTION

Accordingly, it is an object of the present invention to overcome the shortcomings of, and difficulties encountered in connection with, earlier arrangements of the present type.

More particularly, it is an object of the present invention to provide an arrangemenet for removing water from mud which permits easy and unimpededly discharging of mud after dewatering of the same.

It is another object of the present invention to provide an arrangement for removing water from mud which assures such discharging of mud after dewatering than the dewatered mud does not clog the respective discharging ports.

In keeping with these objects, and with others which will become apparent hereafter, one feature of the present invention is that an arrangement for removing water from mud comprises a container of a porous material having a tubular side wall bounding a chamber for receiving mud therein and provided with an inlet opening and an outlet opening which latter has a transverse dimension corresponding to the respective dimension of the chamber; a flexible tubular member located outside and adjacent the outer opening; and means for deforming the flexible tubular member so that the latter closes the outlet opening of the container during dewatering of the mud. The container may consist of a flexible material, may be of a cylindrical shape and may be suspended to a support structure. The deforming means may be operative to twist the flexible tubular portion to thereby close the outlet opening by the thus-twisted tubular member.

The flexible tubular part forms a bottom part of the container during dewatering of the mud. After termination of the process the flexible tubular parts opens the outlet opening, and the dewatered compressed mud is discharged as a whole through the large outlet opening, corresponding in a transverse dimension to the respective dimension of the internal chamber of the container. It is understood that in this case the mud is discharged easily and umimpededly and does not clog any discharge members so that the shortcomings of and the difficulties encountered in connection with earlier arrangements are eliminated.

A front portion of the container adjacent the outlet opening and the flexible tubular member, is clamped between substantially rigid outer and inner ring-shaped members. These members may be made of metal and are connected to one another by screw means extending through the side wall of the container. In this case, the chamber of the container for receiving the mud is located at the one side of the ring-shaped elements, whereas the tubular flexible member is located at the other side of the same.

The flexible tubular member may be of a one-piece with the container. On the other hand, this member may be made as a separate part connected to the front portion of the container. The latter has the advantage that when the container or the tubular member is damaged or worn out, the damaged or worn out part can be replaced by a new one whereas the respective intact part can be repeatedly used.

Another feature of the present invention is that the flexible tubular member has a first portion forming an extension of the side wall fo the container, and a second portion outwardly folded from the first portion so as to form a pocket-shaped hollow between the first and the second portions of the tubular member. The pocket-shaped hollow has longitudinal dimension slightly exceeding a half of the transverse dimension of the chamber of the container. A marginal end portion of the second portion of the tubular member is fixed to a substantially rigid further ring-shaped element, which latter element is rotatable relative to the outer and the inner ring-shaped elements of the container about a common axis.

It is advantageous when a guiding element is provided for guiding the further ring-shaped element during its rotation relative to the outer ring-shaped element of the container. This guiding element may be formed as a rotatable roller mounted on the further ring-shaped element of the tubular member, whereas the outer ring-shaped element of the container may be so constructed that it forms a guide for the guiding roller. For this purpose, an upwardly open U-shaped member may also be provided mounted on the outer ring-shaped element. The latter may also be formed as a tube of an annular cross-section provided with guide bars or dimensioned so as to match the outer surface of the guiding roller. The outer ring-shaped element is fixedly connected to an immovable support structure to assure the relative rotation of the further ring-shaped element of the flexible tubular member relative to the outer ring-shaped element of the container. When the further ring-shaped element is rotated relative to the immovable outer ring-shaped element, the flexible tubular member is deformed and closes the outlet opening of the chamber of the container. The thus-deformed flexible tubular member forms a bottom part of the container.

It is already known to provide an additional means for removing water from mud comprising a perforated tubular member located in the container adjacent an axis thereof and surrounded by an outer tubular member of a porous material, which means speed up dewatering of the mud. In the case when these means are provided, the pocket-shaped part of the flexible tubular member is dimensioned so as to close and open outwardly bounded by the side wall of the container and inwardly bounded by the outer surface of the outer porous tubular member of the additional dewatering means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1b is a plan view of the arrangement shown in FIG. 1a;

Figure 1:
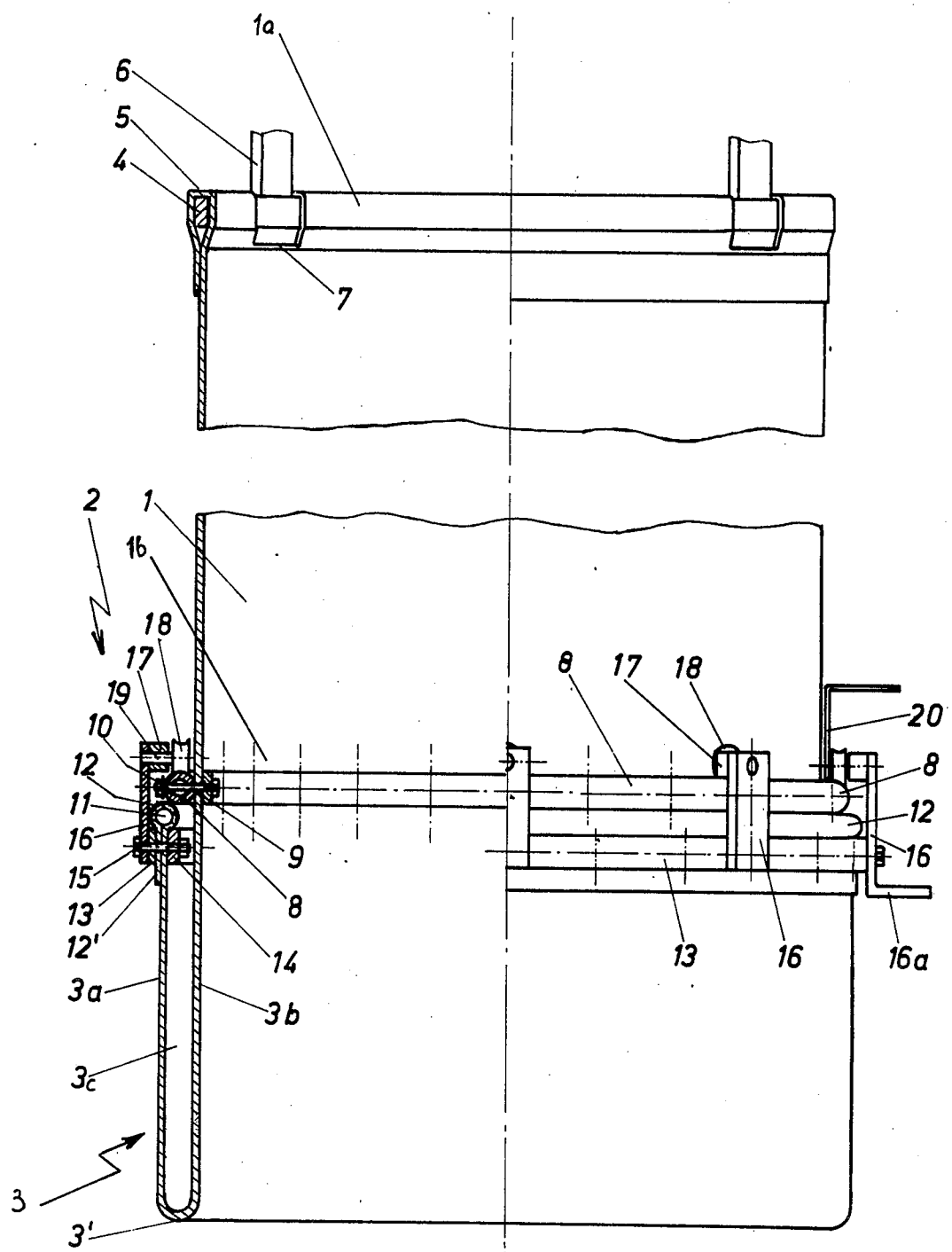
FIG. 1 is a longitudinal sectional view of the arrangement according to the present invention.
Figure 1B:
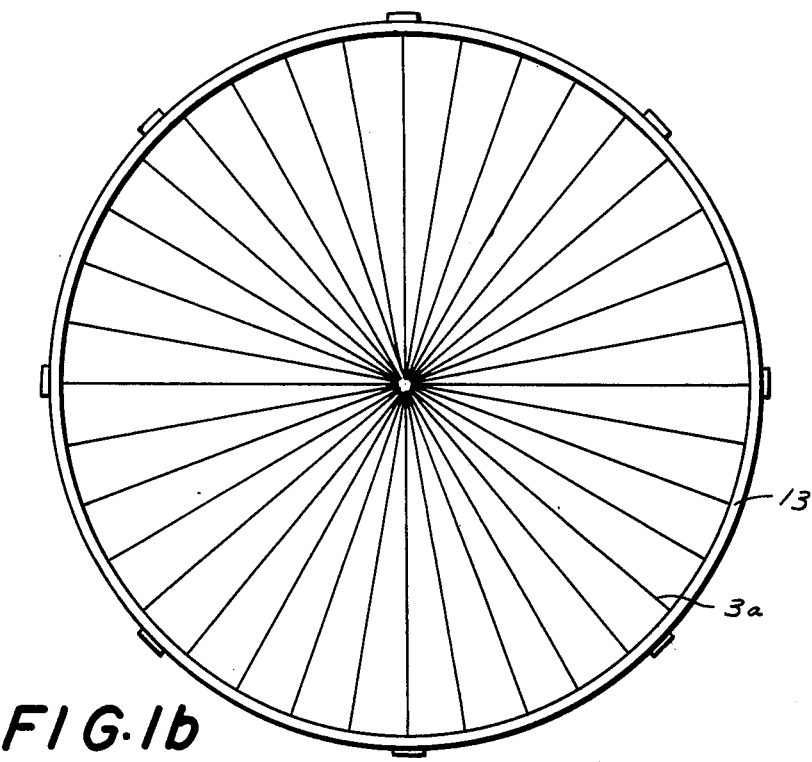

DESCRIPTION OF THE PREFERRED EMBODIMENTS:

Referring now to the drawing, and first to FIG. 1, it may be seen that an arrangement for removing water from mud of the present invention comprises a container identified by reference numeral 1. A side tubular wall of the container 1 bounds a chamber for receiving the mud therein, which chamber has an inlet opening 1a and an outlet opening 1b. The outlet opening 1b has a transverse dimension corresponding to the transverse dimension of the chamber of the container 1. The container 1 is of a flexible porous material, such as for instance, textile fabric and may be made as a one-piece hose fabric. An upper marginal portion of the container 1 adjacent the inlet opening 1a is outwardly folded so as to form a border 5 bounding a pocket-shaped hollow between the latter and the remainder part of the upper marginal portion. A reinforcing element 4 is received in the thus-formed pocket-shaped hollow, and is suspended to a (not shown) support structure by means of suspension elements 6 extending through cutouts 7 formed in the border 5.

A substantially rigid inner ring 9 is located on the inner surface of the container 1 adjacent a lower marginal portion thereof and the outlet opening 1b so that this ring 9 downwardly bounds the chamber of the container 1. A substantially rigid outer ring 8 is located on the outer surface of the container 1 and connected to the inner ring 9 by screws 10 extending through the side wall of the container 1, so that the lower marginal portion of the container 1 is clamped between the outer and inner rings 8 and 9. The rings 8 and 9 may consist of metal. In the shown embodiment, the outer ring 8 is formed as a tubular element of an annular cross-section.

A flexible tubular member 3 is located outside and adjacent the outlet opening 1b of the container 1 and formed as an extension of the latter. The flexible tubular member 3 is outwardly folded at 3' so that it forms a pocket-shaped hollow 3c bounded between an inner portion 3b and an outer portion 3a of the member 3. A longitudinal dimension of the flexible tubular member 3 slightly exceeds a half of the transverse dimension of the chamber of the container 1. An upper marginal portion of the outer portion 3a of the flexible tubular member 3 is again outwardly folded and forms a border 12 bounding a pocket-shaped hollow, in which hollow a reinforcing element 11 is inserted so as to form a bead on the upper marginal portion of the outer portion 3a of the flexible tubular element 3. An outwardly folded part 12' of the upper marginal portion of the outer portion 3a may be sewed, glued or welded to the remainder part of the latter.

Figure 2:
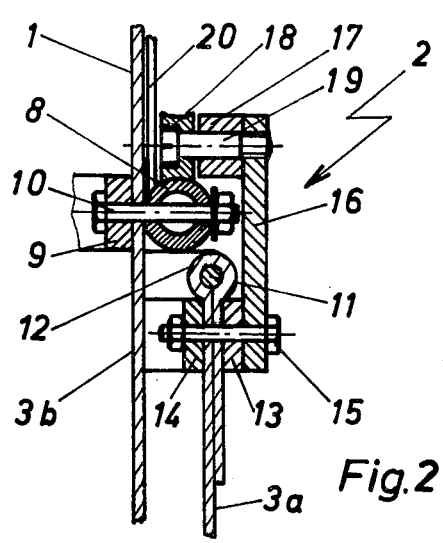
FIG. 2 is a large-scale sectional view of a detail of FIG. 1 showing ring-shaped elements arranged on a marginal end portion of an extension part of a container according to the present invention.

Turning now to FIG. 2, it may be seen that the upper marginal portion of the outer portion 3a of the flexible tubular member 3 is clamped between a further outer ring 14 and a further inner ring 13 below the bead formed by the border 12 and the reinforcing element 11. The further rings 13 and 14 are substantially rigid and connected to one another by screws 15. Supporting brackets 16 are provided whose lower end portions are fixedly connected to the further outer ring 13 and upper end portions are connected with bosses 17. Screws 19, on the one hand, extend through the bosses 17 and mesh the supporting brackets 16 and, on the other hand, form the axes of rollers 18. The latter movably engages the outer surface of the outer ring 8 and preferably consists of a plastic material. The outer contact surface of the rollers 18 match the outer surface of the outer ring 8. The rollers 18 are so dimensioned that they can unimpededly rotate relative to the outer ring 8, and at the same time, are spaced from a mounting member 20 so that the latter does not hinder the rotation of the rollers. The mounting member 20 fixedly connects the outer ring 8 to a non-illustrated support structure so that the ring 8 is immovable when the further outer and inner rings 13 and 14 rotate relative to the ring 8 with the aid of the supporting brackets 16 and the rollers 18. A lever 16a is formed as a handle and mounted on the further outer ring 13. This lever is used for rotating the further outer ring 13 together with the further inner ring 14 relative to the outer and inner rings 8 and 9.

Figure 1A:
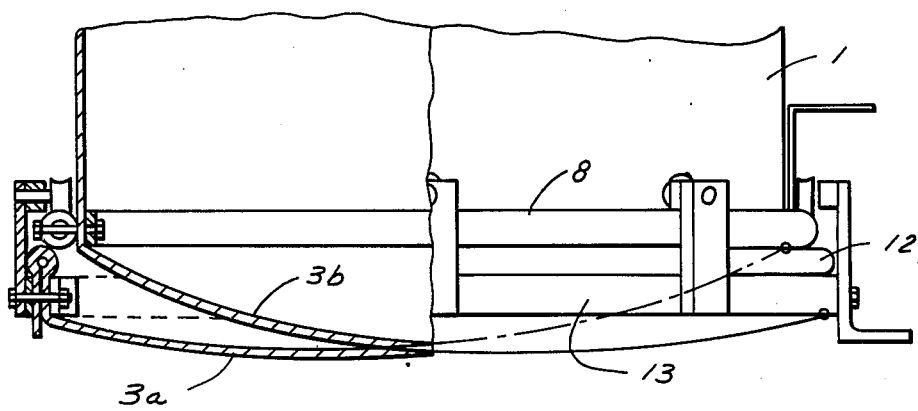
FIG. 1a is the section of FIG. 1, but in a closed condition.

FIG. 1 shows an arrangement in an open position, whereas FIG. 1a shows the same in a closed position in which latter position the outlet opening 1a of the chamber of the container 1 is closed by the flexible tubular members. For closing the outlet opening 1a it suffices to rotate the further rings 13 and 14 of the flexible tubular part 3 relative to the immovable rings 8 and 9 of the container 1. By this rotation the flexible tubular member 3, dimensioned as mentioned above, is deformed (twisted) so that it closes the outlet opening 1b and forms a bottom part of the container 1.

The outer ring 8 may be provided with (not illustrated) outwardly open U-shaped members matching the outer surface of the rollers 18 on the other hand. Instead of provision of the rollers 18 rotatable over the outer surface of the ring-shaped element 8, guide elements may be provided on the latter in a form, for instance, of flat guide bars. It is also advantageous when the further rings 13 and 14 are located not between the inner portion 3b of the flexible tubular member 3 and the supporting bracket 16, but the supporting bracket 16 is fixedly mounted on the inner side of further rings 13 and 14.

Figure 3:
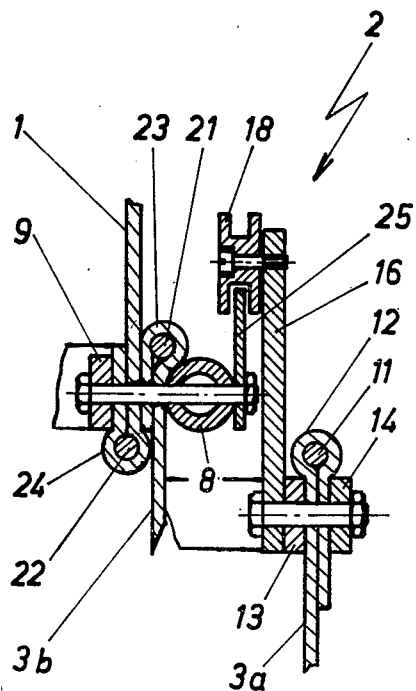
FIG. 3 is a sectional view corresponding to that shown in FIG. 2, but showing another embodiment of the present invention.

FIG. 3 shows another embodiment of the present invention in which guide bars are provided, and the further rings 13 and 14 are located outwardly relative to the supporting bracket 16. In addition, this Figure also shows the possibility to form the fexible tubular member 3 as a separate part of the arrangement connected to the container 1. A lower marginal portion of the container 1 is provided with a border 22 in which border a reinforcing element 24 is located so as to form a lower bead of the container 1. The flexible tubular part 3, in this case is fully separated from the container 1. An upper marginal end portion of the inner and outer portions 3b and 3a of the flexible tubular member 3 are provided, respectively, with borders 12 and 23 surrounding the reinforcing elements 11 and 21. The lower marginal portion of the container 1 provided with the bead formed by the border 24, and the upper marginal portion of the inner portion 3b of the flexible tubular member 3 with the bead formed by the border 23 are clamped together between the outer and the inner rings 8 and 9, so that the above-mentioned beads are located respectively below and above the latter.

The further rings 13 and 14 clamp the upper marginal portion of the outer portion 3a having a bead formed by the border 12. The supporting bracket 16 is fixedly connected to the inner side of the rings 13 and 14, that is to the inner further ring 13.

FIG. 13 also shows another embodiment of guide elements for the rollers 18. These guide elements are formed as bent plate-like rings 25 welded to the outer ring 8 of the container 1. This is advantageous, since in this case the border 23 forming the bead of the inner portion 3b of the tubular member 3 is located above the outer ring-shaped element 8 and thereby, damage of this border 23 is precluded.

Figures 4A, 4B:
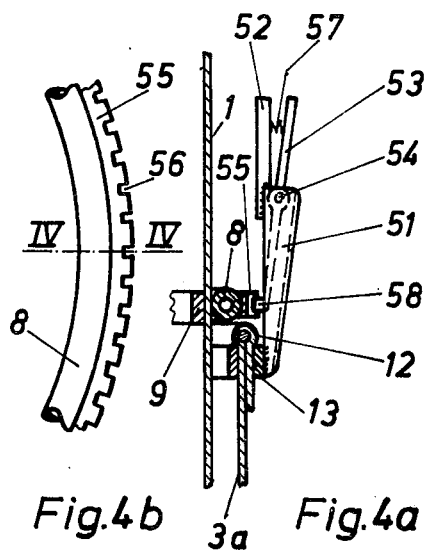
FIGS. 4a and 4b are the respective views showing an arresting means associated with means for closing an outlet opening of a container according to the present invention.

Naturally, the flexible tubular member 3 must be arrested at least in two end positions in which it respectively closes and opens the outlet openings of the container 1. It is also desirable to arrest the flexible tubular member in a plurality of positions intermediate the above-mentioned end positions. For this purpose arresting means are provided which are shown in FIGS. 4a and 4b. FIG. 4a is a partially sectioned side view of the arrangement, whereas FIG. 4b is a top view showing a detail of the arresting means.

The arresting means comprises a first member mounted on the outer ring 8 and provided with a plurality of engageable portions, and a second member connected to the outer further ring 13 and having an engageable portion engageable with the engageable portions of the first member. The first member may be formed as a flat toothed rack 55 with a plurality of teeth, and indentations 56 each located between the pair of adjacent teeth. The second member is formed as a lever 53 having two arms one of which carries the engaging portion formed as cam 58. The lever 53 is pivotally mounted inside a U-shaped supporting part 51 which latter is fixedly mounted on the further outer ring 13 of the flexible tubular member 3 and opens toward the outer surface of the container 1. A further lever 52 is fixedly mounted to the supporting part 51, and a spring 57 is provided pressing the pivotable lever 53 from the immovable lever 52 so that the former is pressed to a position in which the cam 58 engages the respective indentation 56. For rotation of the further outer ring 13 relative to outer ring 8, it suffices to pivot the upper arm of the lever 53 towards the lever 52 so that the lower arm of the same is pivoted in the opposite direction and thereby the cam 58 is removed out of the respective identation 56. Such construction has the advantage that by provision of a plurality of arresting positions the outlet opening may be both entirely and partially opened to a desirable transverse dimension thereof.

Figure 5:
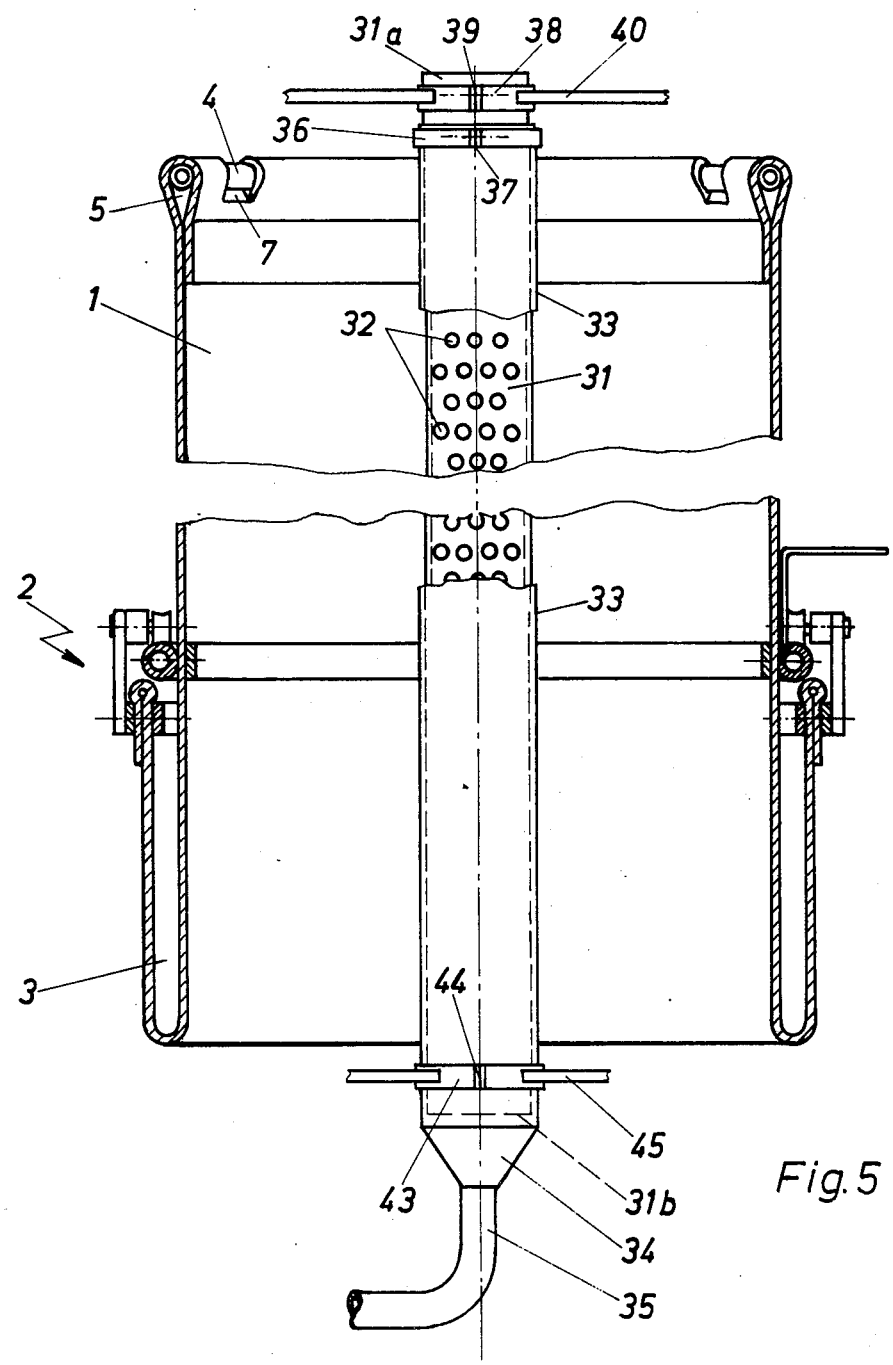
FIG. 5 is a view corresponding to that of FIG. 1, but showing additional means for speeding up dewatering of mud according to the present invention.

In the arrangement shown in FIG. 1, water is removed from mud and passes through the porous side wall of the container. FIG. 5 shows another embodiment of the present invention in which additional means outwardly provided for speeding up dewatering of the mud. The additional means comprise a perforated inner tube 31 extending lengthwise of the axis of the container 1 coaxialy relative to the side wall of the same. An outer tube 33 of a porous mateial, such as, for instance, textile fabric, outwrdly embraces the perforated inner tube 31. These means assure speeding up of dewatering of the mud.

A clamping ring 36 clamps the outer tube 33, which ring 36 has lugs 37 connectable to one another, for instance by screws. Mounting elements 40 and 45 fixedly connect the tubes 31 and 33 to a support structure and are fixedly connected to the former by means of clamping rings 38 and 42 with the aid of lugs 39 and 44, respectively. An upper end portion 31a of the inner tube 31 is open, whereas a lower end portion 31b thereof is closed by the lower end portion of the outer tube 33 outwardly projecting beyond the lower end portion 31b of the inner tube 31. The lower end portion 31b of the outer tube 31 is connected by a funnel-shaped part 34 to offtake pipe 35 for discharging water removed from the mud.

In the above arrangement the outlet opening 1b may also have a transverse dimension corresponding to the respective dimension of the chamber of the container 1. The flexible tubular member 3 in this case must be so dimensioned that in the closed position it closes an opening outwardly bounded by the container 1 and inwardly bounded by the other surface of the outer tube 33, in which case the flexible tubular member 3 outwardly embraces the latter. As for means for deforming the flexible tubular member 3 and thereby closing the outlet opening, these means are similar to those described with regard to the first embodiment of the invention.

Figure 6:
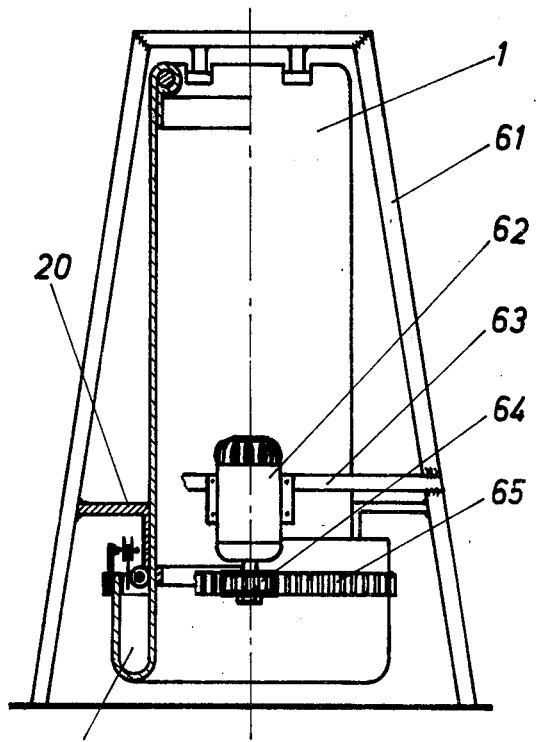
FIG. 6 is a schematic view showing an arrangement of the present invention provided with motor drive means operative for closing an outlet opening of a container in a motorized manner.

Instead of manually rotating at the further rings 13 and 14, they may be rotated in a motorized manner by motor drive means. An exemplary embodiment of such means is shown in FIG. 6 where an electric motor 62 is mounted on the support structure 61 and drives a pinion 64 meshing a gear wheel 65, which latter is fixedly mounted on the further rings 13 and 14. This gear wheel 65 which in the illustrated embodiment is shown as a spur gear sheel, may also be formed as a crown gear wheel. The electric motor 62 may be mounted on the support structure by means of a supporting element such as for instance a part-annular member 63, or a bracket provided on the support structure 61. Switching operation of the electric motor 62 may be so selected that it is automatically switched off in its end position to prevent damage of the arrangement, and is switched on only when actuated in the opposite direction.

It will be understood that each of the elements described above, or two or more together, may also find a useful application in other types of constructions differing from the types described above.

While the invention has been illustrated and described as embodied in an arrangement for removing water from mud, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for dewatering mud and the like forming a cake after dewatering, such as sewage sludge, comprising a container having an axis and a tubular side wall which bounds an interior chamber for accommodating mud and the like to be dewatered and consists of a porous material so that when mud and the like is accommodated in said interior chamber water contained in the mud and the like escapes from the latter through said porous side wall, said interior chamber having an inlet opening for feeding the mud and the like into said interior chamber and an outlet opening for removing the mud and the like from said interior chamber after dewatering the same, said outlet opening having a dimension in a direction transverse to said axis which corresponds to a respective dimension of said interior chamber; a flexible tubular member located outside and adjacent to said outlet opening of said interior chamber and movable between a closed position in which it is twisted substantially about said axis and forms a bottom of container which closes said outlet opening from outside so that the mud and the like accommodated in said interior chamber is retained in the latter by the thus-twisted flexible tubular member during dewatering, and an open position in which said flexible tubular member is untwisted and forms an axial extension of said tubular wall which fully releases said outlet opening so that the mud and the like which has after dewatering the form of a cake can be discharged as a whole from said internal chamber through the thus-released outlet opening having the transverse dimension corresponding to that of said internal chamber; deforming means for twisting and untwisting said flexible tubular member so that the latter closes and opens said outlet opening of said internal chamber, respectively; and means for suspending said container in a substantially upright position.

2. The arrangement as defined in claim 1, wherein said container consists of a flexible material.

3. The arrangement as defined in claim 2, wherein said tubular member is of a one-piece with said container.

4. The arrangement as defined in claim 1, wherein said container is of a cylindrical shape.

5. The arrangement as defined in claim 1, wherein said suspending means includes a supporting structure and means for connecting said container to said supporting sructure.

6. The arrangement as defined in claim 1, wherein said side wall of said container has a front portion adjacent said outlet opening; and further comprising a substantially rigid inner ring-shaped element and outer ring-shaped element located respectively inside and outside said front portion of said side wall and connected with one another so as to clamp said front portion therebetween; and further comprising means for connecting said ring-shaped elements with one another.

7. The arrangement as defined in claim 6; and further comprising means for fixedly connecting said inner and said outer ring-shaped elements with one another.

8. The arrangement as defined in claim 6, wherein said connecting means are screw means engaging said inner and said outer ring-shaped elements and extending through said front portion of said side wall of said container.

9. The arrangement as defined in claim 6, wherein said inner and said outer ring-shaped elements are of metal.

10. The arrangement as defined in claim 6, wherein said tubular member has a first portion forming in said open position said axial extension of said side wall of said container, and a second portion outwardly folded from said first portion so as to form a pocket-shaped hollow between said first and said second portions of said tubular member.

11. The arrangement as defined in claim 10, wherein said pocket-shaped hollow has a longitudinal dimension slightly exceeding a half of the transverse dimension of said chamber of said container.

12. The arrangement as defined in claim 10, wherein said second portion of said tubular member has a marginal end portion; and further comprising a further substantially rigid ring-shaped element located adjacent said outer ring-shaped element, said marginal end portion of said second portion being fixed to said further ring-shaped element.

13. The arrangement as defined in claim 12, wherein said further ring-shaped element of said tubular member is rotatable relative to said outer ring-shaped element of said front portion of said container so as to twist sid tubular member and thereby to close said outlet opening of said chamber.

14. The arrangement as defined in claim 13; and further comprising a guide element for guiding said further ring-shaped element during its rotation relative to said outer ring-shaped element.

15. The arrangement as defined in claim 14, wherein said guide element is a guiding roller mounted on said further ring-shaped element and movably engageable with said outer ring-shaped element.

16. The arrangement as defined in claim 13, wherein said further ring-shaped element is rotatable relative to said outer ring-shaped element between a plurality of positions; and further comprising means for arresting said further ring-shaped element in each of said positions.

17. The arrangement as defined in claim 16, wherein said plurality of positions comprises two end positions in which said further ring-shaped element is located relative to said outer ring-shaped element so that said tubular member respectively closes and opens said outlet opening of said container.

18. The arrangement as defined in claim 17, wherein said plurality of positions comprises intermediate positions defined between said two end positions in which intermediate positions of said further ring-shaped element are located relative to said outer ring-shaped element so that said tubular member closes only a part of said outlet opening.

19. The arrangement as defined in claim 16, wherein said arresting means comprises a first member connected to said outer ring-shaped element and provided with a plurality of engageable portions, and a second member connected to said further ring-shaped element and having at least one engaging portion engageable with said engageable portions of said first member.

20. The arrangement as defined in claim 19, wherein said first member is a toothed rack.

21. The arrangement as defined in claim 19, wherein said second member is a pivotable spring-loaded lever, and said engaging portion is a cam element mounted on said lever.

22. The arrangement as defined in claim 13; and further comprising motor drive means for closing said outlet opening in a motorized manner, said motor drive means operative for rotation of said further ring-shaped element of said tubular member relative to said outer ring-shaped element of said front portion of said container.

23. The arrangement as defined in claim 12, and further comprising an additional substantially rigid ring-shaped element located outside said marginal end portion of said second portion of said tubular member, said further ring-shaped element being located inside said marginal end portion of said second portion of said tubular member so that said marginal end portion is clamped between said further and said additional ring-shaped members.

24. The arrangement as defined in claim 6, wherein said outer ring-shaped element is formed as a tube of an annular cross-section.

25. The arrangement as defined in claim 6; and further comprising a support structure, said outer ring-shaped element being provided with means for fixing the same to said support structure.

26. The arrangement as defined in claim 25, wherein said fixing means is an angle member fixedly connected to said outer ring-shaped element and to said support structure.

27. The arrangement as defined in claim 1; and further comprising additional means for dewatering of the mud located in said chamber adjacent said axis.

28. The arrangement as defined in claim 27, wherein said additional means comprises an additional tubular member provided with a plurality of perforations and extending lengthwise of said axis of said chamber substantially concentric to said wall of said container, and an outer tubular element of a porous material fitted on the outer surface of said additional tubular member.

29. The arrangement as defined in claim 28, wherein said additional tubular member has a marginal end section, and said outer tubular element having a further marginal end section outwardly projecting beyond said marginal end section of said additional tubular member and connectable to an offtake pipe for discharging fluid removed from the mud.

30. The arrangement as defined in claim 1, wherein said container has a front end portion adjacent said outlet opening, and said flexible tubular member is formed as a separate part displaceably connectable to said container.

* * * * *